Aug. 22, 1939.          B. C. CHAPPELL          2,170,470
ANIMAL TRAP
Filed May 14, 1938
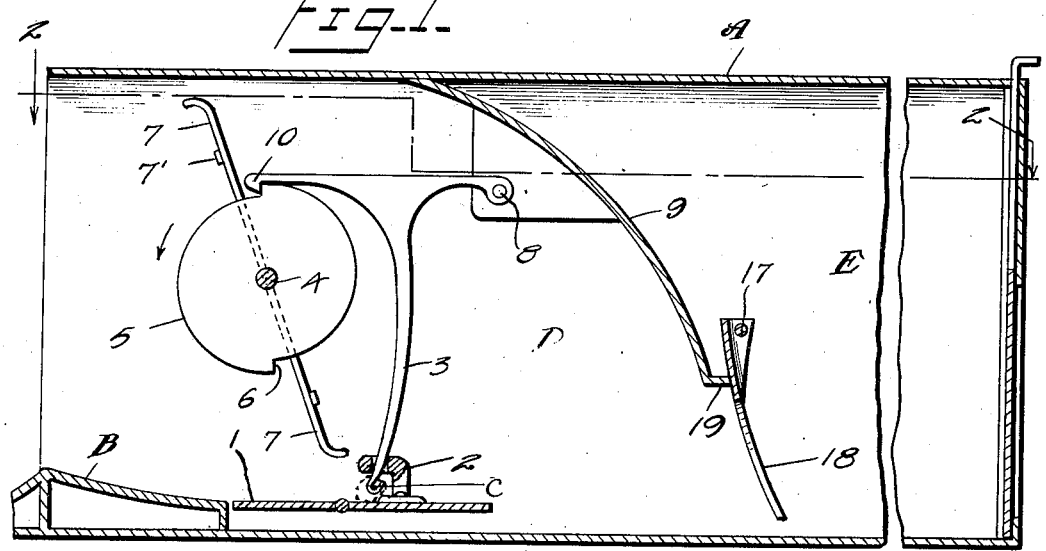
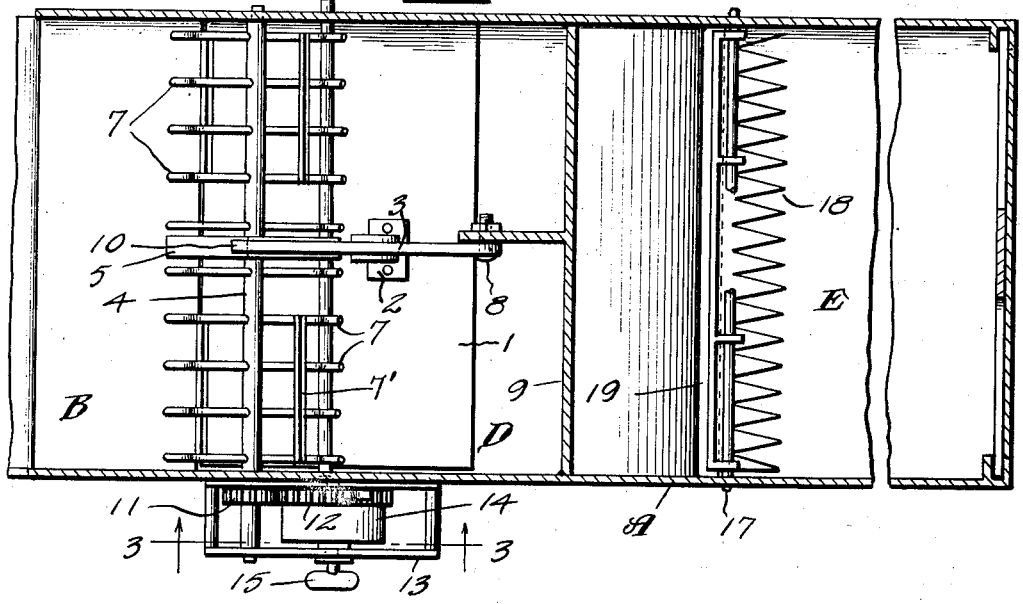
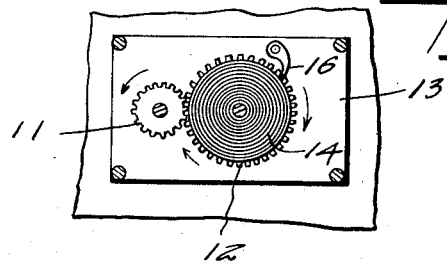
Inventor
B.C.Chappell
By Watson E. Coleman
Attorney Patented Aug. 22, 1939

2,170,470

UNITED STATES PATENT OFFICE 2,170,470

ANIMAL TRAP

Bert C. Chappell, Kansas City, Mo.

Application May 14, 1938, Serial No. 208,011

3 Claims. (Cl. 43—74)

This invention relates to certain new and useful improvements in animal traps and comprehends as one of its most important objects a trap which is automatically set by the victim.

Another object of the invention is to provide a trap more particularly designed for catching rats and which may entrap a large number of animals before requiring resetting thereof.

A further object of the invention is to provide a trap which shall be simple in construction, requiring few parts, convenient in use and effective and reliable in operation.

With these and other objects in view as will be more fully explained as the description proceeds, the invention consists in certain construction and arrangement of parts as shall hereinafter be described and claimed.

In the drawing:

Figure 1 is a side view illustrating the working relation of the parts of the invention.

Figure 2 is a horizontal sectional view on the line 2—2 of Fig. 1.

Figure 3 is a detail sectional view taken on the line 3—3 of Figure 2, showing the spring operated gear mechanism.

Referring to the drawing, in which like numerals represent like parts, A designates a box, cage or other suitable housing for the trap mechanism. The box A may be constructed of any inexpensive material such as wood, metal and the like. B indicates a platform (the front section being shown as broken off in Figure 1) constituting an entrance into the trap proper.

A pivoted pedal member 1 is mounted immediately behind the platform B on the inner side of the trap and carries a pedal finger 2 thereon which engages the lower end of a trigger arm 3. The pedal finger and trigger arm may be adapted for working relation by means of a ball and socket joint or similar structure thereto. The bait C may be secured to the extreme lower end of the trigger arm 3 in such manner as to conceal the pedal finger 2.

A shaft 4 carrying a rotary disk 5 is mounted above the pedal member 1, this disk having toothed segments 6, as shown in Figure 1. A plurality of rake fingers 7, extending across the trap entrance, are also mounted on the shaft 4 and are adapted for rotation upon movement of the rotary disk 5. It will be observed that the rake fingers 7 may be reinforced by one or more cross bars 7' to prevent spreading of the fingers in a large trap.

The trigger arm 3 is pivotally connected at 8 to a partition 9 which extends entirely across the cage from the top thereof, stopping short of the bottom, as best illustrated in Fig. 1 for a purpose hereinafter described. The trigger arm 3 is further provided with a forwardly extending finger or hook element 10 which alternately engages in the toothed segments 6 upon rotation of the disk 5.

The mechanism for operating the trap, as shown in Figures 2 and 3, comprises a set of spring controlled gears attached to one of the outer side walls of the trap as follows. On an extension of the shaft 4 is mounted a small gear 11 which meshes with a larger gear 12 mounted in the housing 13. The gear 12, and through it the smaller gear 11, are driven by a spring member 14, which may be wound by means of a key 15 applied to the shaft of the large gear 12 in the same manner as a clock.

A pawl 16 attached to the housing 13, is adapted to engage the large gear 12 to prevent reverse movement of the gears and shaft 4 when the spring is almost run down.

In the rear of the trap and dividing the same into compartments D and E will be seen a partition 9 to which is secured at 8, as stated, the rearwardly extending portion of the trigger arm 3.

Carried by a rod 17 extending transversely across the trap chamber and in close relation to the partition 9 so as to form a continuation thereof, are a second set of rake fingers 18. These rake fingers are adapted to swing toward the rear wall of the trap but are prevented from swinging forward by the horizontal portion 19 of the partition 9.

In operation, the spring 14 is wound by turning the key 15. The lower end of trigger arm 3 is placed in the pedal finger 2. The trap is now set for automatic operation. The weight of a mouse or rat pressed lightly on the pedal 1 will cause the front end to go down and the rear part carrying pedal finger 2, to rise. This movement releases the lower end of trigger arm 3 from pedal finger 2 and also lifts the hook 10 of the trigger arm from engagement with the toothed segment 6 on the rotary disk 5.

Through the action of the gears 11 and 12 and the pressure of spring 14, the shaft 4 is revolved causing the rotary disk 5 and the rake fingers 7 to revolve one-half of a revolution. The trigger finger 10 is again caught in the succeeding tooth segment 6 of the rotary disk and the trap is all set for another victim.

During this action, which may be repeated forty or fifty times, the animal has been kicked inside the trap chamber D by the rake fingers 7 and into the back compartment E.

It will be seen from the foregoing description, in connection with the accompanying drawing, that I have provided an efficient and desirable animal trap capable of catching a large number of animals and which, after being set, works automatically without attention for some time.

What is claimed is:

1. In an animal trap, a rotating disk having a plurality of teeth thereon, a trigger arm normally engaging said teeth, a shaft, rake fingers mounted on said shaft and adapted to be rotated with said rotating disk, a pedal, said pedal having a finger to engage an end of said trigger arm, and a pair of coacting gear members, one of said gears having a spring associated therewith, said spring and gear causing rotation of the disk and rake fingers upon depression of the pedal.

2. An animal trap comprising a cage formed with an entrance opening, a tiltable pedal member disposed horizontally in the cage at the rear of the entrance opening and provided with an upstanding finger, a partition extending across the cage from the top thereof but stopping short of the bottom of the cage, a trigger arm pivotally connected to said partition and extending forwardly therefrom and provided at its forward end with a hook, said trigger arm being operatively connected to the pedal member whereby the arm will be raised upon the tilting of the pedal member in one direction, and a spring actuated mechanism mounted in the cage above and in the rear of the entrance opening, said mechanism including a rotatable shaft, a toothed disk engageable by the hook of the trigger arm, and rake fingers extending radially from said shaft.

3. An animal trap comprising a cage formed with an entrance opening, a tiltable pedal member disposed horizontally in the cage at the rear of the entrance opening and provided with an upstanding finger, a partition extending across the cage from the top thereof but stopping short of the bottom of the cage, a trigger arm pivotally connected to said partition and extending forwardly therefrom and provided at its forward end with a hook, said trigger arm being operatively connected to the pedal member whereby the arm will be raised upon the tilting of the pedal member in one direction, a spring actuated mechanism mounted in the cage above and in the rear of the entrance opening, said mechanism including a rotatable shaft, a toothed disk engageable by the hook of the trigger arm and rake fingers extending radially from said shaft, a rod extending across the cage at the rear of said partition, and a plurality of fingers depending from said rod, across the space between the lower edge of the partition and the bottom of the cage and adapted to abut against said partition to limit the forward movement of said fingers.

BERT C. CHAPPELL.